W. W. ESSICK.
GOGGLES.
APPLICATION FILED JUNE 2, 1914.

1,121,911.

Patented Dec. 22, 1914.

WILLIAM W. ESSICK, INVENTOR

WITNESSES
J. R. Kelly
James Myers

BY
ATTORNEY

UNITED STATES PATENT OFFICE.

WILLIAM W. ESSICK, OF READING, PENNSYLVANIA.

GOGGLES.

1,121,911.     Specification of Letters Patent.     Patented Dec. 22, 1914.

Application filed June 2, 1914. Serial No. 842,378.

*To all whom it may concern:*

Be it known that I, WILLIAM W. ESSICK, a citizen of the United States, residing at Reading, in the county of Berks and State of Pennsylvania, have invented certain new and useful Improvements in Goggles, of which the following is a specification.

My invention relates to optical glasses, and is directed particularly to that class of spectacles commonly known as "goggles", and especially to those having eye-shields.

The principal objects of my invention are, to greatly simplify the construction of such glasses by providing eye-shields extended to form temples; to provide eye-shields pivotally mounted on the eye-wires and movable toward each other to fold the temples into a collapsed overlapped position, and extending in substantially a common plane adjacent to the eyes of the goggles; and to provide means tending to retain said temples extended in relatively diverging planes.

Other objects of my invention are, to provide eye-shields so mounted on the eye-wires as to substantially coincide, when in open position, with that portion of the periphery of the eye wires that may be included between the pivotal mountings; and to provide a detent on the end pieces of the eye-wires for engaging said eye-shields.

Further objects of my invention are, to provide reticulated eye-shields having flexible temples rigidly carried thereby and movable therewith; and to provide temples whose only attachment is with the free perimeter of the shields.

My invention also includes all of the various novel features of construction and arrangement hereinafter more definitely specified.

Figure 1:
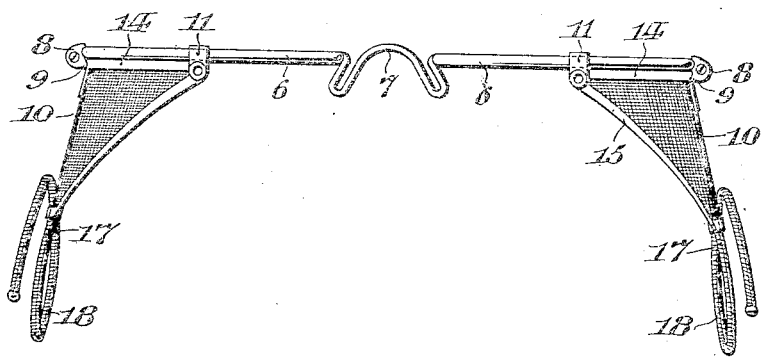
Figure 2:
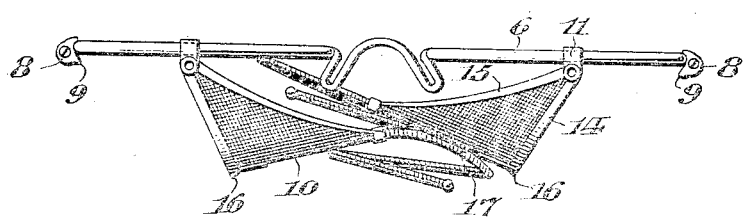
Figure 3:
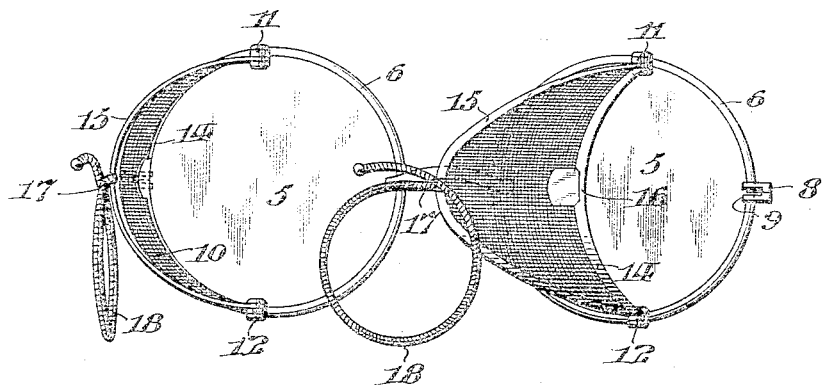

In the accompanying drawings, Figure 1 is a plan view of a pair of goggles conveniently embodying my invention, showing the temples extended in open position; Fig. 2 is a plan view of said goggles showing the temples in the folded or closed position; and Fig. 3 is a rear elevational view showing the left temple open and corresponding with the position shown in Fig. 1, and the right temple closed and corresponding to the position shown in Fig. 2.

In said figures, the lenses 5 are mounted in the eye-wires 6, which are connected by the bridge 7 and have the end pieces 8 projecting laterally and forming detents 9 for the parabolic-shaped eye-shields 10.

As best shown in Figs. 1 and 2, the eye-shields 10 are pivotally carried by the lugs 11 and 12, which project in substantially diametrically opposite relation from the upper and lower portion of the eye-wires 6.

The eye-shields 10 are preferably reticulated, having the semi-circular rim portion 14 and the semi-ovate rim portion 15, the former being provided at its crest with the outwardly extending projection 16 arranged to engage the detent 9 when in the open position shown in Fig. 1, and the latter having secured thereto the temple 17 which projects centrally therefrom, and which is preferably formed of helically coiled spring wire forming the flexible loop 18 for engaging the ears of the wearer.

The rim portion 14 of the eye-shield 10 is preferably shaped to substantially conform to that portion of the eye-wire 16 or the periphery of the lens 5 which is included between the pivotal lugs 11 and 12, so that no portion of the lens 5 will be obstructed by said eye-shield 10, and therefore the entire area of the lens 5 will be available to the vision of the wearer.

It will be observed that the pivotal connections including the lugs 11 and 12 serve not only to support the eye-shields 10 but also carry the temples 17, thus eliminating the usual pivotal connection of the temples 17 with the end pieces 8, which provide the detent 9 for rigidly retaining the eye-shields 10 and the temples 17 in the open position.

My invention is advantageous, in that while the eye-shields and temples may be folded into a comparatively small space when not in use, they are maintained in substantially rigid relation to the eye frame when in position to be worn.

I do not desire to limit my invention to the precise details of construction and arrangement herein set forth, as it is obvious that various modifications may be made therein without departing from the essential features of the invention as defined by the appended claims.

Having thus described my invention, I claim:

1. A frame having eye-wires, eye-shields pivotally connected with said eye-wires, and temples permanently secured to said eye-shields.

2. A frame having eye-wires, eye-shields pivotally connected with said eye-wires, and temples rigidly secured to the free edges of said eye-shields.

3. A frame having eye-wires provided with lateral detents, eye-shields pivotally connected with the respective eye-wires at substantially diametrically opposite sides and having means arranged to be engaged by said detent, and temples carried by said eye-shields and projecting outwardly from the free edge thereof.

4. A pair of goggles having lens rims, eye-shields pivotally supported at substantially diametrically opposite edges of the respective rims, and a temple permanently and rigidly secured to the free edges of each of said eye-shields and movable therewith.

5. As an article of manufacture, a combined eye-shield and temple for goggles, formed in a single piece and arranged to be hingedly connected with the lens rims of said goggles.

6. A pair of goggles having folding eye-shields provided with temples whose only attachment is with the free edges of the shields.

7. A pair of goggles having lens rims, and comprising eye-shields hingedly connected therewith, and substantially conforming to the periphery of said rims when in open position, temples permanently secured to the free ends of said shields, and means for retaining said shields and temples in open position.

8. As an article of manufacture, a combined eye-shield and temple for goggles, comprising an ovate frame having separate points of pivotal engagement and a reticulated web extending over the space included within said frame and a flexible ear engaging piece formed on the edge of the frame.

9. A pair of goggles having eye-shields pivotally attached thereto, each shield having an ear engaging member formed on its free end.

10. An eye-shield for goggles comprising a frame arranged to be pivotally attached to the goggles and having an ear engaging member formed on its free end.

11. An eye-shield and temple formed integrally and provided with means for pivotally attaching it to a goggle.

In witness whereof, I have hereunto set my hand this 1st day of June, A. D., 1914.

WILLIAM W. ESSICK.

Witnesses:
  Ed. A. Kelly,
  Clara E. Young.